United States Patent [19]

Bouchy et al.

[11] 3,895,519

[45] July 22, 1975

[54] ELECTRONIC CONTROL SYSTEM FOR FLUID MEASUREMENT OF A CLOSED AIR SPACE

[75] Inventors: Jean C. Bouchy; T. J. Hardman, both of Cincinnati, Ohio

[73] Assignee: McNay Equipment Company, Inc., Cincinnati, Ohio

[22] Filed: June 25, 1974

[21] Appl. No.: 482,884

[52] U.S. Cl. .................................................. 73/149
[51] Int. Cl. ............................................. G01f 17/00
[58] Field of Search ............................. 73/149, 426

[56] References Cited
UNITED STATES PATENTS
3,489,002  1/1970  Thompson ........................... 73/149
FOREIGN PATENTS OR APPLICATIONS
152,078  9/1962  U.S.S.R. ............................... 73/149

*Primary Examiner*—Jerry W. Myracle
*Attorney, Agent, or Firm*—Lane, Aitken, Dunner & Ziems

[57] ABSTRACT

In a system for measuring the volume of a closed air space, for example, the volume of the air space above the liquid in a container, an electronic control system employs a logic circuit to sequence first and second solenoid valves. The first valve interconnects a source of fixed fluid pressure with a reference vessel of known volume having a pressure transducer connected thereto. The second valve interconnects an unknown volume with the reference vessel. When the control circuit is energized, the first valve is closed and the second opened to equalize the pressure in the known and unknown volumes. Activating a manual switch closes the second valve and opens the first to charge the isolated reference vessel with fluid pressure. When the output of the pressure transducer exceeds a predetermined arbitrary level, an electrical comparator signals the control circuit to close the first valve and open the second to discharge the vessel into the unknown volume, whose measure is indicated by the final pressure read by the same transducer at equilibrium.

5 Claims, 3 Drawing Figures

ELECTRONIC CONTROL SYSTEM FOR FLUID MEASUREMENT OF A CLOSED AIR SPACE

BACKGROUND OF THE INVENTION

This invention relates generally to volume measurement and more particularly to an electronic control system for carrying out a special procedure for measuring unknown volumes.

In the marketing of beverages in restaurants and bars, it is desirable to be able to quickly determine the inventory stored in containers from which the supply of beverages has been partially depleted. The present invention provides a small, portable, simple electro-pneumatic system for taking such inventory measurements by measuring the volume of the air space above the liquid remaining in the vessel containing the partially depleted supply. This measurement is taken by charging a relatively small known volume to a known pressure above atmoshperic, then exhausting the known volume into the unknown air space volume and then measuring the resulting pressure. This procedure for measuring an unknown volume was known before the present invention but its application generally involved cumbersome manually operated equipment.

CROSS-REFERENCE TO RELATED APPLICATION

The copending U.S. Pat. application Ser. No. 435,667 entitled "System for the Measurement of a Closed Air Space," filed Jan. 23, 1974 by Jean C. Bouchy et al., discloses portable apparatus with a fluidic control system for carrying out a similar type of measuring operation.

SUMMARY OF THE INVENTION

The general purpose of the present invention is to provide an automatic electronic control system for carrying out volume measurements by pneumatic means.

In accordance with the present invention, a regulated gas supply is connected via a first solenoid valve to a small reference vessel of known volume in fluid communication with a pressure transducer having an electrical output. The reference vessel is interconnected with an unknown volume by a second solenoid valve.

An electronic control system with a logic circuit sequences the first and second solenoid valves in response to initial energization of the circuit, a manual switch input and the output of the pressure transducer, to perform the following operations in sequence: (1) closing the first valve and opening the second to set the valves in their starting position, (2) closing the second valve and opening the first to charge the isolated reference vessel; and (3) when the transducer output exceeds an arbitrary level, closing the first valve and opening the second to exhaust the pressurized known volume into the unknown volume, the measure of which is indicated by the pressure read by the same transducer at equilibrium following discharge. By connecting the pressure transducer directly to the reference vessel, the transducer can produce an output indicative of the reference pressure to which the known volume is initially charged as well as the final pressure after equalization of the pressure in the known and unknown volumes. In one embodiment, the logic circuit employs clocked flip-flops to insure properly spaced activation of the solenoid valves.

Further objects and advantages of the present invention will become apparent from the drawings of the invention and the following detailed description of the preferred embodiment of the invention.

DESCRIPTION OF THE PREFERRED EMBODIMENT

Figure 1:
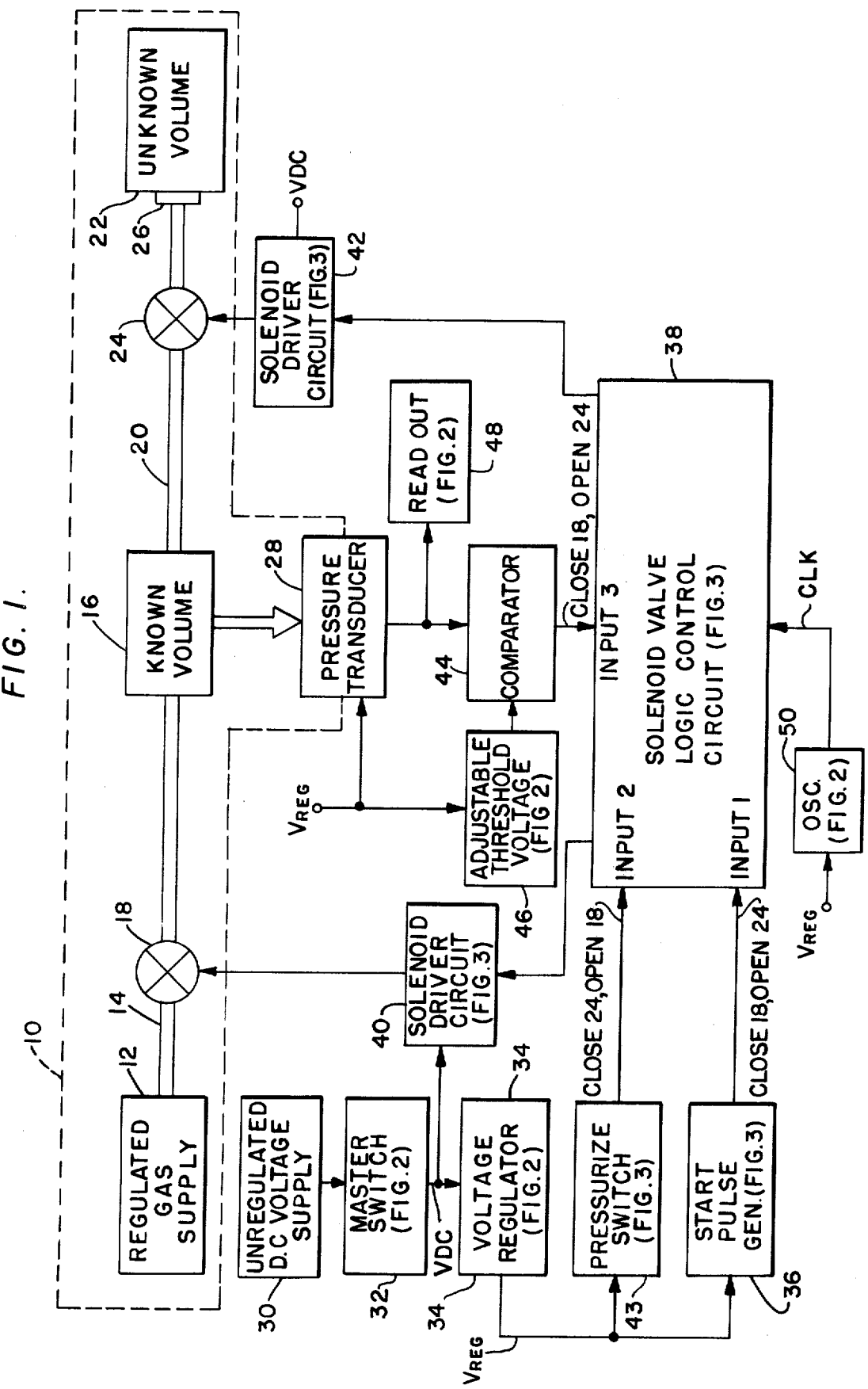
FIG. 1 is a block diagram of a pneumatic measurement system operated by an electronic control system, according to the invention.

FIG. 1 illustrates the overall functional components of the measuring system according to the invention. For a better understanding of the invention, FIG. 1 is divided into two parts. A mechanical/pneumatic measuring portion 10 of the system is enclosed by a dashed line. The remainder of FIG. 1 represents the electronic control system for sequencing the two solenoid valves and reading out the unknown volume measurement. In the pneumatic measuring portion of the system, the reference number 12 designates a source or supply of fluid pressure. Although not essential, it is preferable that supply 12 be regulated to provide a fixed fluid pressure. A pneumatic line 14 is connected between the supply 12 and a small reference vessel 16 of precisely known volume via a first solenoid-operated valve 18. Another pneumatic line 20 connects the reference vessel 16 with an unknown volume 22 via a second solenoid-operated valve 24. In practice, the unknown volume 22 is, for example, the air space above the liquid remaining in a bottle. The line 20 may be sealably connected to the mouth of the bottle by means of a suitable universal fitting 26, for example, a flexible air-tight collar, force-fitted to the bottle.

A pressure transducer 28 is pneumatically connected to the reference vessel 16. The precise location of the transducer input is not critical so long as it is between the two valves 18 and 24. The pressure transducer 28 is an electromechanical device which produces a voltage output linearly related to the difference in pressure between the pressure in the known volume and atmospheric pressure.

The remainder of FIG. 1 concerning the electronic control system is designed to alternately actuate the solenoid valves 18 and 24 in sequence, in response to energization of the system, a manual switch input and the output of the transducer 28 to perform the following sequential operations:

1. to close the first valve 18 and open the second 24 to set the initial condition for the valves at the beginning of the measurement;

2. to close the second valve 24 and open the first 18 to charge the isolated known volume 16 with pneumatic pressure above atmospheric;

3. when the output of transducer 28 exceeds an arbitrary level, to close the first valve 18 and open the second 24 to disconnect the known volume 16 from the gas supply 12 and to exhaust the pressurized known volume 16 into the unknown volume 22, whereby the equalized final pressure in the known volume is read out by the transducer 28 as a value inversely proportional to the exact measure of the unknown volume.

In the functional block diagram of FIG. 1, the electronic control system is powered by an unregulated D.C. voltage supply 30 (e.g., a low voltage battery), on/off-switched by a master switch 32 providing an unregulated voltage output VDC to a voltage regulator 34 producing a regulated voltage $V_{REG}$ which represents, in the logic circuit discussed below, a particular binary logic value. The regulated voltage $V_{REG}$ is fed to a start pulse generator 36 which produces a momentary logic value as the initial control input (No. 1) to a solenoid valve logic control circuit 38. The control input from the generator 36 causes the first valve 18 to be closed by a first solenoid driver circuit 40 and the second valve 24 to be opened by a second solenoid driver circuit 42. After the pneumatic line 20 has been positively coupled to the unknown volume 22 by the fitting 26, the operator commences charging of the known volume 16 by a manual "pressurize" switch 43 which applies a control input (No. 2) to the logic control circuit 38 causing the second valve 24 to close and the first valve 16 to open, thereby interconnecting the isolated known volume 16 with the gas supply 12.

The remainder of the operation is entirely automatic. A comparator 44 refers the output of the pressure transducer 28 to an adjustable reference or threshold voltage produced by a circuit 46. Precisely when the comparator 44 senses that the pressure in the known volume 16 exceeds the reference pressure established by the threshold circuit 46, the comparator generates a control input (No. 3) to the logic control circuit 38 which causes the first valve 18 to close, disconnecting the known volume 16 from the gas supply 12, and the second valve 24 to open, discharging or exhausting the pressurized known volume 16 into the unknown volume 22. At equilibrium the pressure transducer 28 provides an output to a readout circuit 48 indicative of the final pressure in both the known and unknown volumes 16 and 22. The final pressure provides an indication of the unknown volume 22. The unit is automatically ready for the next measurement since step (3) above becomes step (1) simply by disconnecting the fitting 26 from one unknown volume and connecting it to another, during which process the known volume is vented to the ambient pressure through the open second valve 24. The sequencing of the valves 18 and 24, that is, the opening and closing of the valves 18 and 24 in the proper order and with the proper time interval, is enforced by utilizing an oscillator 50 producing a strobe or clock input to the logic control circuit 38.

Figure 2:
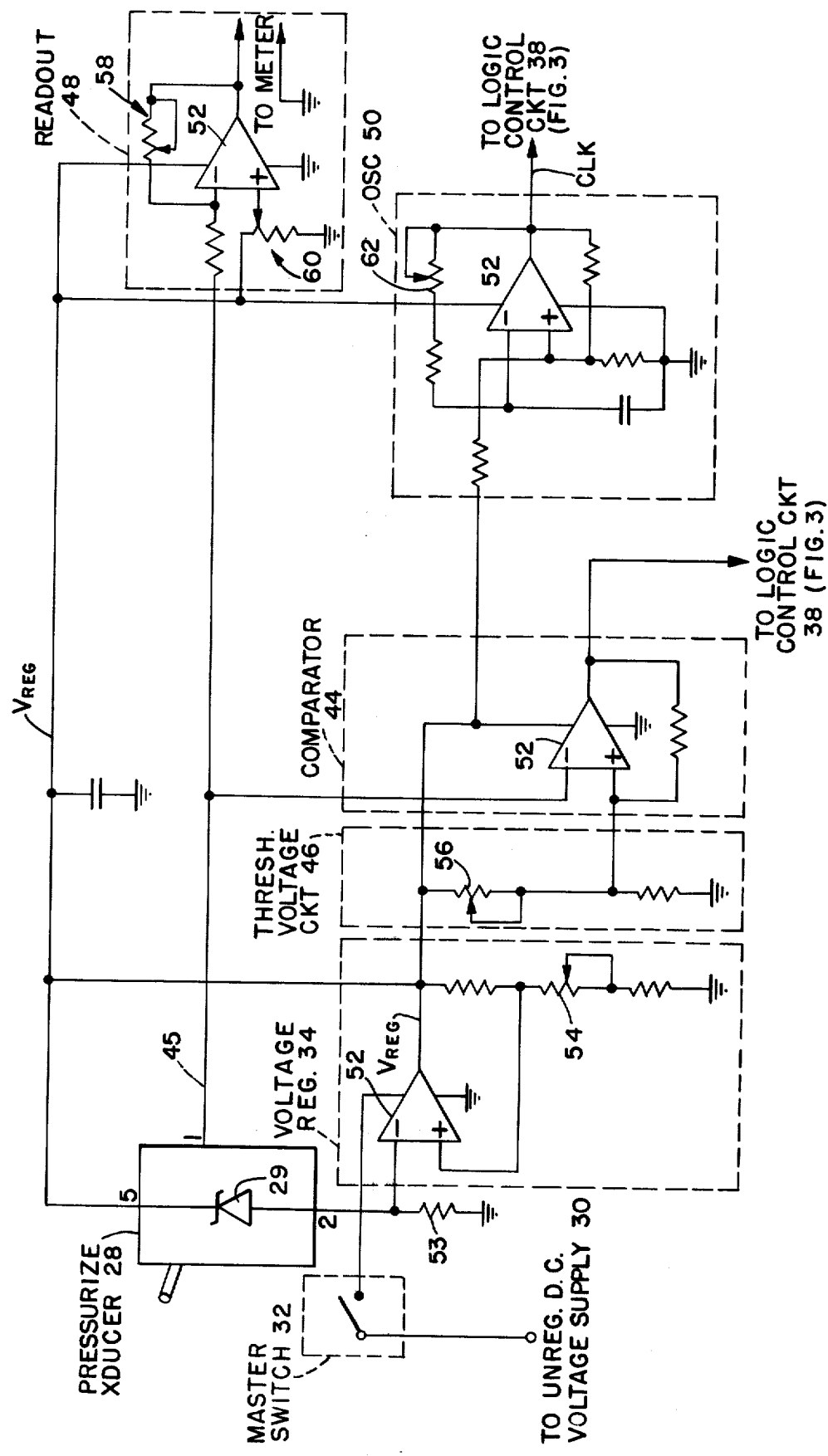
FIG. 2 is an electrical schematic diagram illustrating the voltage regulator, comparator with adjustable threshold voltage and oscillator circuits of FIG. 1 in more detail.
Figure 3:
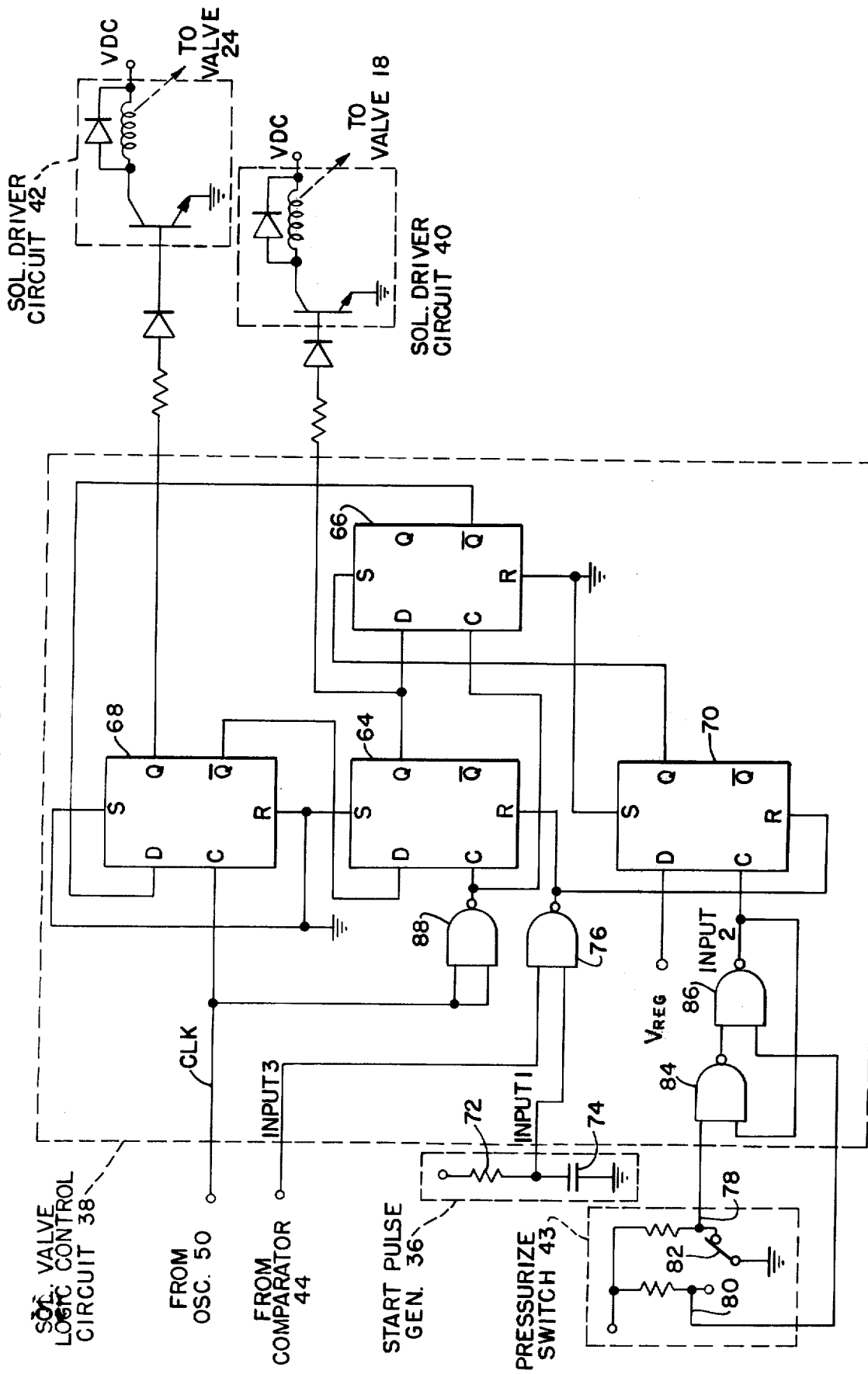
FIG. 3 is an electrical schematic diagram illustrating the two solenoid valve driver circuits, the solenoid valve logic control circuit and associated circuitry of FIG. 1 in more detail.

The details of a structural embodiment of the electronic control system of FIG. 1 are shown in the schematic diagrams of FIGS. 2 and 3. It should be noted in particular in FIG. 2 that the functional heart of the voltage regulator 34, comparator 44, readout circuit 48 and oscillator 50 can be provided by four identical operational amplifiers 52. The three operational amplifiers 52 in the comparator 44, readout circuit 48 and oscillator 50 can be implemented, for example, by using three of the four operational amplifiers typically provided together in a single linear integrated circuit (e.g., quad amplifier LM 324). However, because the operational amplifier in the voltage regulator 34 has a different power supply connection, it would have to be provided separately in this instance because quad amplifier circuits normally have common power supply connections.

In the voltage regulator 34, the inverting input of the operational amplifier 52 is connected to the junction of a grounded resistor 53 and a terminal (2) of a special pressure transducer 28, namely the National Semiconductor Corp. NLX 1603A which incorporates, among other things, a zener diode 29 connected between the terminals 2 and 5. Terminal 5 of the transducer 28 is in turn connected to $V_{REG}$, the output of the regulator amplifier 52. The zener diode establishes a reference voltage input to the operational amplifier 52 as well as a fixed voltage for the transducer circuit (not shown). A portion of the output of the operational amplifier 52, $V_{REG}$, is fed back to the noninverting input of the operational amplifier 52. The feedback circuit includes a voltage divider for setting the level of $V_{REG}$ by means of a variable resistor 54. When the operational amplifier 52, connected as illustrated, is furnished with power from the unregulated D.C. voltage (e.g., 12 to 36 volts D.C.), the operational amplifier 52 produces the output $V_{REG}$ which can be set, for example, between 10 and 15 volts by the resistor 54.

The regulated voltage $V_{REG}$ is also applied to the threshold voltage circuit 46 which includes a voltage divider having a variable resistor 56 for setting the reference voltage for the comparator 44. The reference voltage input to the comparator 44 provided by circuit 46 is, for example, 0.11 $V_{REG}$ up to $V_{REG}$, and is applied to the noninverting input of the operational amplifier 52 in the comparator. The other input to the comparator 44 is provided by the output signal voltage of the pressure transducer 28 on line 45 (terminal 1 of NLX 1603A), which signal voltage represents the pressure detected by the transducer. This input to the comparator 44 is provided to the inverting input of the amplifier 52. The comparator circuit 44 provides a hysteris voltage of 0 to 0.3$V_{REG}$ to offset the levels at which the output of the comparator 44 switches when on the one hand the pressure is rising and on the other when the pressure is falling, in order to prevent oscillations in the output of the comparator. In addition to preventing oscillations, the hysteresis of the comparator is to be adjusted so that the unknown volume under measurement must be disconnected and the system returned to ambient pressure before another measuring cycle can be initiated. In other words, the hysteresis voltage can be employed to prevent the comparator output from reverting to its normal logic 1 state until ambient pressure is reached.

The output signal voltage of the pressure transducer 28 in line 45 is also applied to a readout circuit 48 including another operational amplifier 52. The inverting terminal (signal input) is connected to receive the voltage output of the transducer 28 on line 45. Operational feedback is connected from the amplifier output to the signal input via variable resistor 58 for varying the effective gain ("meter swing"). Meter zeroing or offset adjustment is provided by the potentiometer 60 connected to $V_{REG}$. A meter (not shown) is normally connected across the amplifier output. Alternatively, if a numerical display is desired, the amplifier output can be connected to an analog-to-digital converter which produces an output, for instance, to a light emitting diode (L.E.D.) display via a conventional L.E.D. driver circuit (not shown).

The oscillator 50 is implemented in the form of a free-running multivibrator built upon the operational amplifier 52 connected as illustrated, to produce a square wave output. The frequency of the oscillator output can be adjusted by means of a variable resistor 62, for example, between 15 and 45 hertz, i.e., from a 22 to a 67 millisecond period.

In FIG. 3, the solenoid valve logic control circuit 38 is implemented by means of four identical "D-type" flip-flops 64, 66, 68 and 70. These four D flip-flops could be provided, for example, by two RCA integrated circuits CD 4013. It will be helpful in understanding the operation of the flip-flops 64-70 to keep in mind that the "clock" inputs (C) to the flip-flops are not all the same. In fact the only one that takes the direct output of the oscillator 50 is the flip-flop 68; the flip-flops 64 and 66 receive the inverted clock signal and the flip-flop 70 is connected to receive an independent, special nonrepetitive gate pulse provided by the pressurize switch 43, instead of a clock signal.

The operation of the logic control circuit 38 will now be described from a functional point of view. Beginning with the first operation (control input No. 1), actuating the master switch 32 (FIGS. 1 and 2) automatically applies $V_{REG}$ to the start pulse generator 36 (FIG. 3) which includes a series resistor 72 connected to ground by a capacitor 74. The control input No. 1 to the logic circuit 38 is taken from the junction of the resistor 72 and the capacitor 74. Control input No. 1 is normally at $V_{REG}$ which is defined as the logic value 1. However, when $V_{REG}$ is first applied to the start pulse generator 36, current flows through the capacitor 74 until it is charged. During this brief period (e.g., 47 milliseconds), the voltage at the control input No. 1 drops to ground, i.e., the logic value 0. Control input No. 1 is passed to a two-input NAND gate 76 whose other input is control input No. 3 from comparator 44 which is 1 ($V_{REG}$) at all times other than the time at which the pressure in the unknown volume 16 exceeds the reference pressure established by the threshold circuit 46. Accordingly, when the master switch 32 is actuated, the input No. 1 is 0 and the input No. 3 is 1. The NAND gate 76 output value 1 is applied to the "reset" input (R) of the flip-flop 64 which causes the output (Q) of the flip-flop 64 to be 0 so that the solenoid driver circuit 40 for the first valve 18 is deenergized and the first valve is closed under the action of a spring bias which normally biases it closed in the absence of an energizing current. The output (Q) of the flip-flop 64 is also connected to the flip-flop 66 as the data input (D) thereof. When the data input (D) to the flip-flop 66 is 0, the inverted output (Q) of the flip-flop 66 is reset to 1. The inverted output (Q) of the flip-flop 66 becomes the data input (D) to the flip-flop 68 which sets the output (Q) of the flip-flop 68 to 1 when the clock pulse arrives, about 30 milliseconds later, to energize the solenoid driver circuit 42 causing the second valve 24 to open. Like valve 18, valve 24 when deenergized is normally biased to the shut or closed condition.

To produce the control input No. 2, the pressurize switch 43 (FIG. 3) includes a pair of leads 78 and 80 connected through respective resistors to $V_{REG}$. However, lead 78 is normally grounded via a contact switch element 82. The movable portion of the contact switch 82 can be disengaged from the lead 78 and placed in contact with the lead 80 to ground that lead by means of a push button or other implementation. The lead 78 provides one input to a second two-input NAND gate 84. The output of the NAND gate 84 provides one input to a third two-input NAND gate 86. The other input to the NAND gate 86 is the lead 80 of the pressurize switch 43. The output of the NAND gate 86 provides the control input No. 2 as well as the other input to the NAND gate 84. When the lead 78 is normally grounded, the logic input to the NAND gate 84 is 0 and therefore the output of the NAND gate 84 must be 1. The lead 80 of the pressurize switch 43 is connected through a resistor to $V_{REG}$ and therefore represents a logic 1. The two 1 inputs to the NAND gate 86 produce the control input No. 2 in the 0 state. When the pressurize switch 43 is actuated to switch the movable element of the contact switch 82 over into contact with the lead 80, the input from the lead 80 to the NAND gate 86 goes to 0. Thus, the output of the NAND gate 86 becomes 1 as the control input No. 2 to the "clock" input (C) of the remaining flip-flop 70. The data input (D) of the flip-flop 70 is tied to $V_{REG}$ and thus the output (Q) of the flip-flop 70 goes to 1 as the set input (S) to flip-flop 66. Accordingly, the inverted output (Q) of the flip-flop 66 goes to 0 which resets the flip-flop 68 so as to deenergize the solenoid driver circuit 42 and close the valve 24. At the same time, the inverted output (Q) of the flip-flop 68 goes to 1 which sets the flip-flop 64 when the inverted clock pulse arrives at the flip-flop 64 approximately 30 milliseconds later. The clock input (C) to the flip-flops 64 and 66 is inverted by a fourth NAND gate 88, which may be provided with the other three two-input NAND gates in a single conventional chip. The output (Q) of the flip-flop 64 being 1, the solenoid driver circuit 40 is energized to open the first valve 18.

When the known volume 16 has been charged to the predetermined pressure, the output of the comparator 44 (control input No. 3) switches from 1 to 0. As a result, the output of the NAND gate 76 becomes 1, which resets flip-flops 64 and 70 via their R inputs. The immediate effect is to deenergize the solenoid driver circuit 40 allowing the valve 18 to return to its normally closed position. However, the 0 state of the data input (D) to the flip-flop 66 causes its inverted output (Q) to become 1 which is applied to the data input (D) of the flip-flop 68. When, 30 milliseconds later the flip-flop 68 is clocked, its (Q) output goes to 1. Consequently, the solenoid driver circuit 42 is energized to open the valve 24 between the known and unknown volumes 16 and 22. The equilibrium pressure will then indicate the unknown volume. The control input No. 3 must be received before the pressurize switch 43 can be reactuated to resequence the operation because the flip-flop 70 can only be reset by the control input No. 3.

The unknown volume can be calculated or calibrated directly on a meter according to the following equation:

$$V_u = V_{REF} \left[ (P_{REF}/P_{FINAL}) - 1 \right]$$

where $V_u$ is the unknown volume 22; $V_{REF}$ is the known volume of the reference vessel 16; $P_{REF}$ is fluid pressure equivalent to the threshold voltage of the comparator 44 and $P_{FINAL}$ (the only variable of which $V_u$ is a function) is the pressure in the unknown and known volumes at equilibrium. The derivation of this formula is given in the referenced copending application.

One of the distinctive features of the system described herein is that the pressure of the gas supply 12 need not be fixed, or even known, because the pressure in the reference vessel is determined as an arbitrary level attained by the transducer (28) output. In the referenced copending application, the pressure in the reference vessel was determined such that it equalled the known fixed pressure of the supply, and the gauge was located between the unknown volume and the second valve, isolated from the reference vessel when the second valve was closed. In the present system, the transducer plays the dual role of determining both the reference pressure and the final pressure.

Another means of implementing this type of control system would be to use specially adapted solenoid valves which would close immediately on command but open only after a brief delay following the command to open, in which case a single unclocked, set-reset flip-flop could provide complementary outputs to the two solenoid valve driver circuits, control inputs Nos. 1 and 3 (FIGS. 1 and 3) providing a reset input and No. 2 providing a set input.

Those skilled in the art of electrical circuit design will recognize that the preferred embodiment discussed above is implemented with certain parameters in mind, for example the availability of certain integrated circuits and the overall part count, as well as the practicality of the power supply. Many modifications and adaptations of the above disclosed system in various applications are possible by those skilled in the art without departing from the underlying principles of the invention. The above described embodiment is therefore intended to be illustrative only and by no means restrictive. The scope of the invention is intended to be defined by the appended claims, and all modifications and adaptations that come within the range of equivalence thereof are intended to be embraced therein.

We claim:

1. A system for measuring an unknown volume, comprising a source of fluid pressure, a vessel of predetermined volume, first electrically controlled valve means having open and shut conditions and being operable to provide a first fluid connection between said source of predetermined pressure and said vessel in said open condition and to interrupt said first fluid connection in said shut condition, second electrically operated valve means having open and shut conditions and being operable in said open condition to provide a second fluid connection between said vessel and the unknown volume and to interrupt said second fluid connection in said shut condition, transducer means in fluid communication, with said vessel between said first and second valve means for providing an electrical output analog of the pressure in said vessel, an electrical control circuit responsive to a start pulse, a pressurize signal and the output of said transducer means for performing the following functions in sequence: (1) in response to said start pulse shutting said first valve means and opening said second valve means, (2) in response to said pressurize signal, shutting said second valve means and opening said first valve means to charge said vessel with pressure, and (3) in response to the output of said transducer attaining a predetermined level, shutting said first valve means and opening said second valve means to discharge the pressure in said vessel into the unknown volume, whereby the output of said transducer when the pressures in said vessel and in the unknown volume are at equilibrium is a measure of the unknown volume.

2. The system of claim 1, wherein said electrical control circuit includes means for establishing a predetermined delay between the opening or closing of one of said valve means and the opening or closing of the other of said valve means.

3. The system of claim 2, wherein said means for establishing said delay includes a plurality of interconnected flip-flops and an oscillator circuit operatively connected to provide different clock inputs thereto.

4. The system of claim 1, wherein said electrical control circuit includes comparator means operatively receiving the output of said transducer means and having an adjustable threshold level such that said comparator means produces an output signalling the attainment of a predetermined pressure in said vessel when said transducer output exceeds said threshold level.

5. A system for measuring an unknown volume, comprising a source of fluid pressure, a known volume, a first valve interconnecting said known volume with said source, a second valve interconnecting said known volume with the unknown volume, transducer means in fluid communication with said known volume between said valves producing an output indicative of the pressure in said known volume, means for closing said first valve and opening said second valve to set the initial condition for the valves, means for closing said second valve and opening said first valve to charge said known volume with pressure from said source, comparator means receiving said transducer means ouput for producing an output indicative of the attainment of a predetermined pressure level in said known volume, and means responsive to said comparator means output for automatically closing said first valve and opening said second valve to exhaust said known volume into the unknown volume, the output of said transducer means at equilibrium being indicative of the measure of the unknown volume.

* * * * *